(12) United States Patent
Stahulak et al.

(10) Patent No.: US 7,272,281 B2
(45) Date of Patent: Sep. 18, 2007

(54) POWERED FIBER CABLE

(75) Inventors: Chuck Stahulak, Chicago, IL (US);
Bruce Barnes, Crystal Lake, IL (US);
Wayne Heinmiller, Elgin, IL (US);
Shadi Khoshaba, Skokie, IL (US);
Nikhil Marathe, Chicago, IL (US);
Henry Towster, Barrington, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 11/345,604

(22) Filed: Feb. 1, 2006

(65) Prior Publication Data

US 2007/0189679 A1 Aug. 16, 2007

(51) Int. Cl.
*H01B 11/22* (2006.01)

(52) U.S. Cl. .................................................. 385/101
(58) Field of Classification Search ......... 385/100–101
See application file for complete search history.

(56) References Cited

U.S. PATENT DOCUMENTS

| | | | |
|---|---|---|---|
| 5,539,851 A * | 7/1996 | Taylor et al. ................ | 385/101 |
| 6,236,789 B1 * | 5/2001 | Fitz ............................. | 385/101 |
| 6,246,821 B1 * | 6/2001 | Hemken et al. ............. | 385/101 |
| 6,618,526 B2 * | 9/2003 | Jackman et al. ............ | 385/102 |

* cited by examiner

*Primary Examiner*—Sarah Song
(74) *Attorney, Agent, or Firm*—Toler Schaffer LLP

(57) ABSTRACT

An optical fiber for information transmission contains a glass tube core wrapped in a sheath of conductive material attachable to a power source such as a battery or generator to transmit power via the conductive sheath of the fiber. Methods to transmit power via an optical fiber, together with fiber optic networks are described.

5 Claims, 6 Drawing Sheets

POWERED FIBER CABLE

FIELD OF THE DISCLOSURE

The present disclosure relates to fiber optic cables, and in particular to fiber optic cable having one or more conductive sheaths around a fiber optic core such that the conductive sheaths are adapted to transmit power along the fiber optic cable.

BACKGROUND

A fiber optic cable may typically contain a plurality of bundles of optical fibers, each bundle having from dozens to hundreds of optical fibers. Each optical fiber typically has a fiber optic core consisting of a glass tube with refractive properties selected to contain electromagnetic transmissions. Radiating concentrically from the core may be a plurality of layers, often of alternating dielectric and conductive materials, housed in a protective jacket, which forms the exterior concentric layer of the fiber. For example, one layer might consist of a hygroscopic material to exclude water from the cable to keep the cable dry, while another layer might consist of an insulator to protect the cable from electrical surges or lightning hits.

Additionally, one or more protective sheaths are often among the layers interior to the jacket. Typically, the purpose of the sheaths is to stiffen the cable so that the cable cannot bend so far as to damage the glass fiber optical core. The sheaths are frequently composed of copper fiber that is suitably disposed around an interior layer. It is not uncommon that one or more sheaths are composed of braided copper wire formed into a tube, when viewed in isolation from the cable.

BRIEF DESCRIPTION OF THE DRAWINGS

The detailed description that follows, by way of non-limiting examples of embodiments, makes reference to the noted drawings in which reference numerals represent the same parts throughout the several views of the drawings, and in which:

FIG. 2 B is a cross-sectional view of the fiber optic cable of FIG. 2A.

DETAILED DESCRIPTION

In view of the foregoing, through one or more various aspects, embodiments and/or specific features or sub-components, the present disclosure is thus intended to bring out one or more of the advantages that will be evident from the description. The present disclosure makes reference to one or more specific embodiments by way of illustration and example. It is understood, therefore, that the terminology, examples, drawings and embodiments are illustrative and are not intended to limit the scope of the disclosure.

Optical fiber cable from a Central Office (CO) to a Service Area Interface (SAI) Optical Line Terminal (OLT) box may have a metallic sheath that can carry current, which may be advantageous when commercial alternating current (AC) is unavailable, for example. As the fiber cable count gets larger, the OFNR (Optical Fiber, Non-conductive, Riser) metallic sheath gets thicker.

The metallic sheath may vary in size based, for example, on the amount of fibers in the cable. The presence of thick sheaths of conductive metal in fiber optic cables suggests that a great amount of current may be carried along the fiber optical cable by connecting one or more sheaths to a source of current. Such current may provide continuous Central Office power to areas. For example, power may be provided to an area where FTTP is being deployed but that lacks Commercial AC. Power may also be deployed to SAI mounted boxes.

Figure 1:
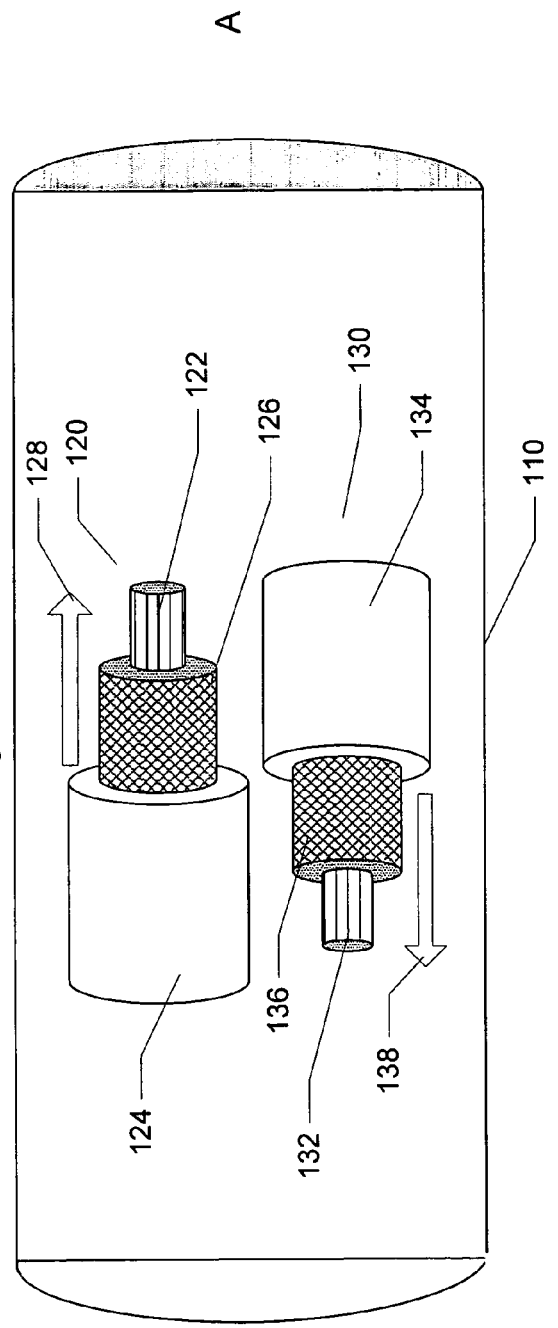
FIG. 1 is a diagrammatic illustration of a fiber optic cable of a specific exemplary embodiment of the present disclosure.

FIG. 1 is a diagrammatic illustration of a fiber optic cable of a specific exemplary embodiment of the present disclosure. The embodiment of FIG. 1A represents a fiber optic cable 110 housing a plurality of fiber optic fibers 120, 130. Each fiber 120, 130, has an optical core 122, 132; jacket 124, 134; and insulated conductive sheath 126, 136; respectively. Sheath 126 may carry a current in a first direction 128. Similarly, sheath 136 may a current in a second direction 138. For example, direction 128 may represent the "from battery" or anode direction of a voltage or current source whereas direction 138 may represent the "to battery" or cathode direction of the voltage source. Accordingly, by providing a plurality of fibers in a cable, one may readily ascertain that power may be transmitted through the plurality of insulated conductive sheaths 126, 136 within the cable 110.

Figure 2:
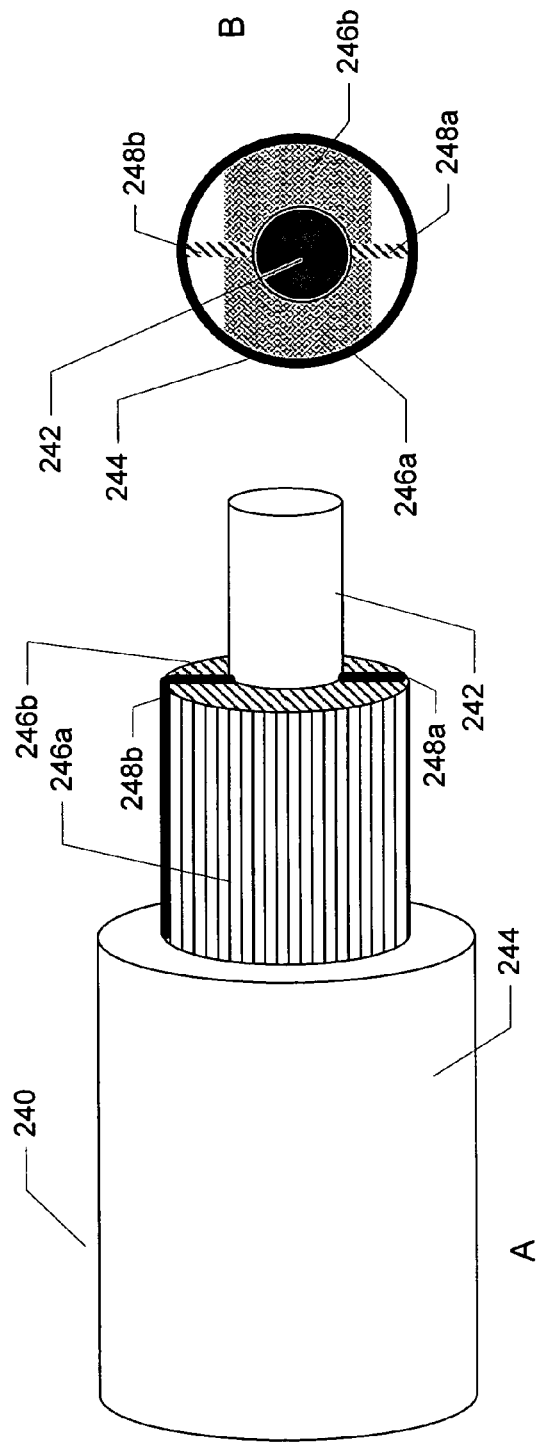
FIG. 2 A is an isometric diagrammatic illustration of a fiber optic cable of an alternative specific exemplary embodiment of the present disclosure.

FIG. 2A is an isometric diagrammatic illustration of a fiber optic cable 240 of an alternative specific exemplary embodiment of the present disclosure and FIG. 2B is a cross-sectional view of the fiber optic cable 240 of FIG. 2A. Optical core 242 and jacket 244 are present as described above in FIG. 1. The insulated conductive sheath, however, is subdivided into two or more portions 246a and 246b by dielectric strips 248a and 248b. Accordingly, current from a voltage source may be carried by a single fiber having one or more split sheaths, rather than by two or more fibers as depicted in FIG. 1. It may be readily apparent that the sheath of FIGS. 2A, B may be effectively subdivided a plurality of times to provide a plurality of currents.

Figure 3:
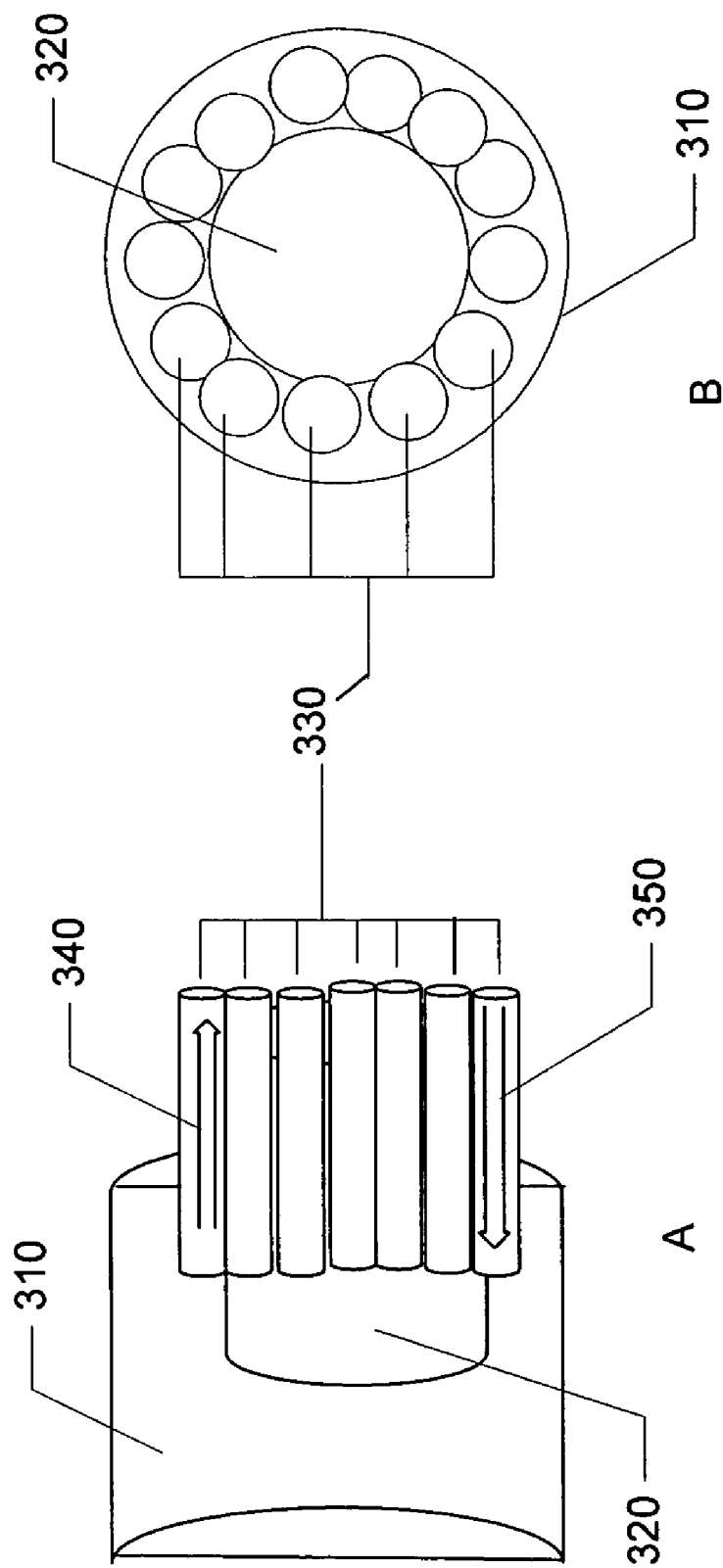
FIG. 3A is a diagrammatic illustration of a fiber optic cable of another alternative specific exemplary embodiment of the present disclosure.
FIG. 3B is an alternative view of the fiber optic cable of FIG. 3A.

FIG. 3A is a diagrammatic illustration of a fiber optic cable of another alternative specific exemplary embodiment of the present disclosure and FIG. 3B is an alternative view of the fiber optic cable of FIG. 3A. In FIG. 3A, Jacket 310 is depicted in lateral cross-section to show optical core 320 disposed within jacket 310. A plurality of sheath fibers 330 is disposed around core 320 to form a sheath. Sheath fibers 330 may be braided or otherwise woven together to form the sheath. One or more sheath fibers 330 may include an insulated conductor to carry current 340, 350. FIG. 3B depicts the cable of FIG. 3A in a front end vertical cross-section to reveal the arrangement of sheath fibers 330 around core 320.

Figure 4:
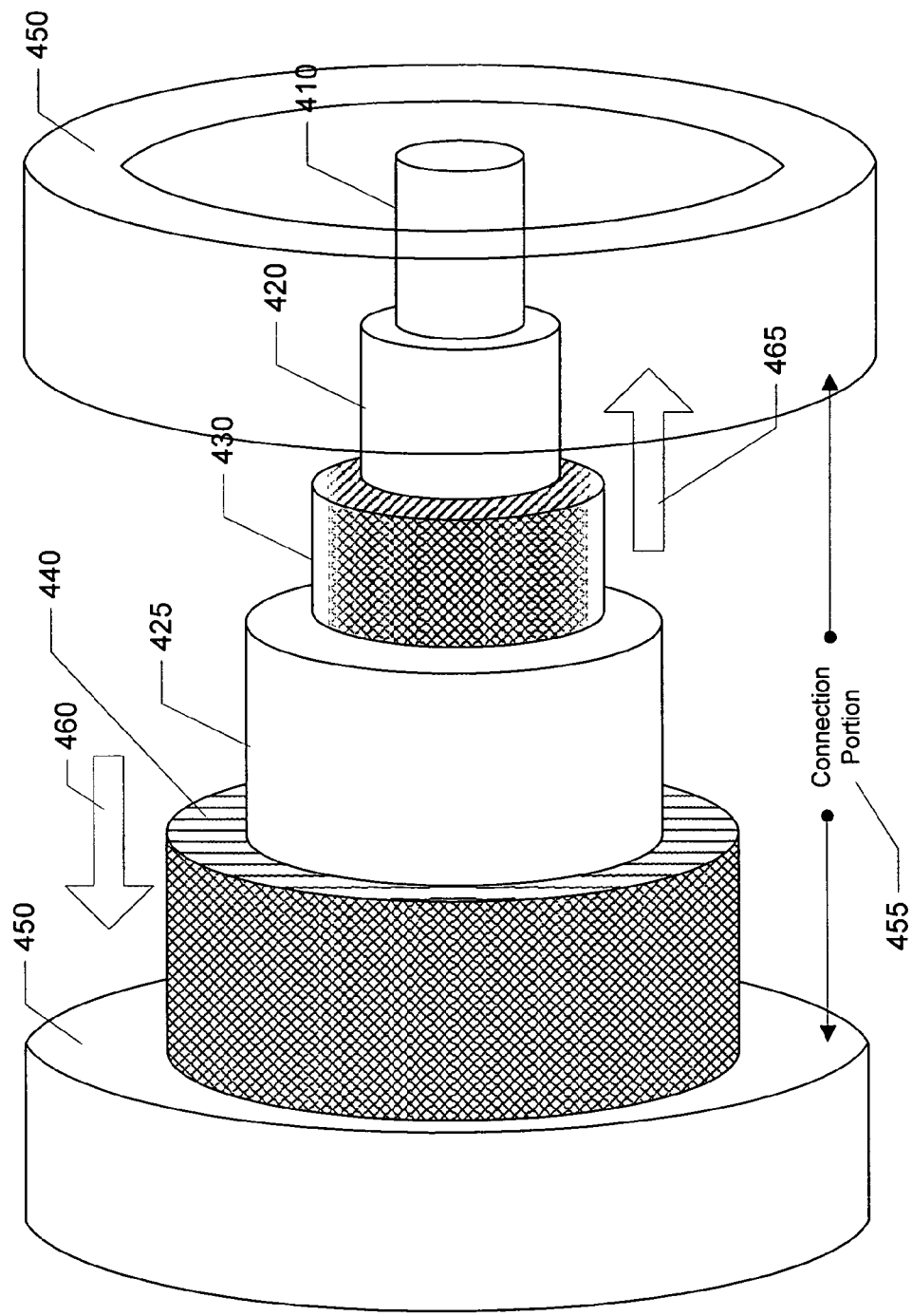
FIG. 4 is a diagrammatic illustration of a fiber optic cable of yet another alternative specific exemplary embodiment of the present disclosure.

FIG. 4 is a diagrammatic illustration of a fiber optic cable of yet another alternative specific exemplary embodiment of the present disclosure. Radiating concentrically outward from optical core 410 are layer 420, sheath 430, layer 425, sheath 440 and jacket 450. Layer 425 may be, for example, a dielectric material or an insulator to electrically isolate sheath 430 from sheath 440.

Current from a voltage source may be carried in direction 460 by insulated conductive sheath 440 and in direction 465 by insulated conductive sheath 430. Again, a single fiber may carry current in two or more directions. However, rather than providing a plurality of fibers, as shown in FIG. 1, or subdividing a single sheath as shown in FIGS. 1A, B; here a plurality of sheaths in a single fiber may be electrically isolated from each other by arranging them in concentric rings to obtain a comparable result.

Also shown in FIG. 4 is connection portion 455, which may include an opening in Jacket 450 through which connection may be made between a power source such as battery or a generator and one or more conductive sheaths.

A fiber optic cable construction, which may also be capable of power transmission, may contain a plurality of optical fibers that employ any one or more of the described embodiments in any permutation suitable to obtain a desired result. Thus may a fiber optic system intended primarily for information transmission be adapted to be a power transmission line construction as well.

Figure 5:
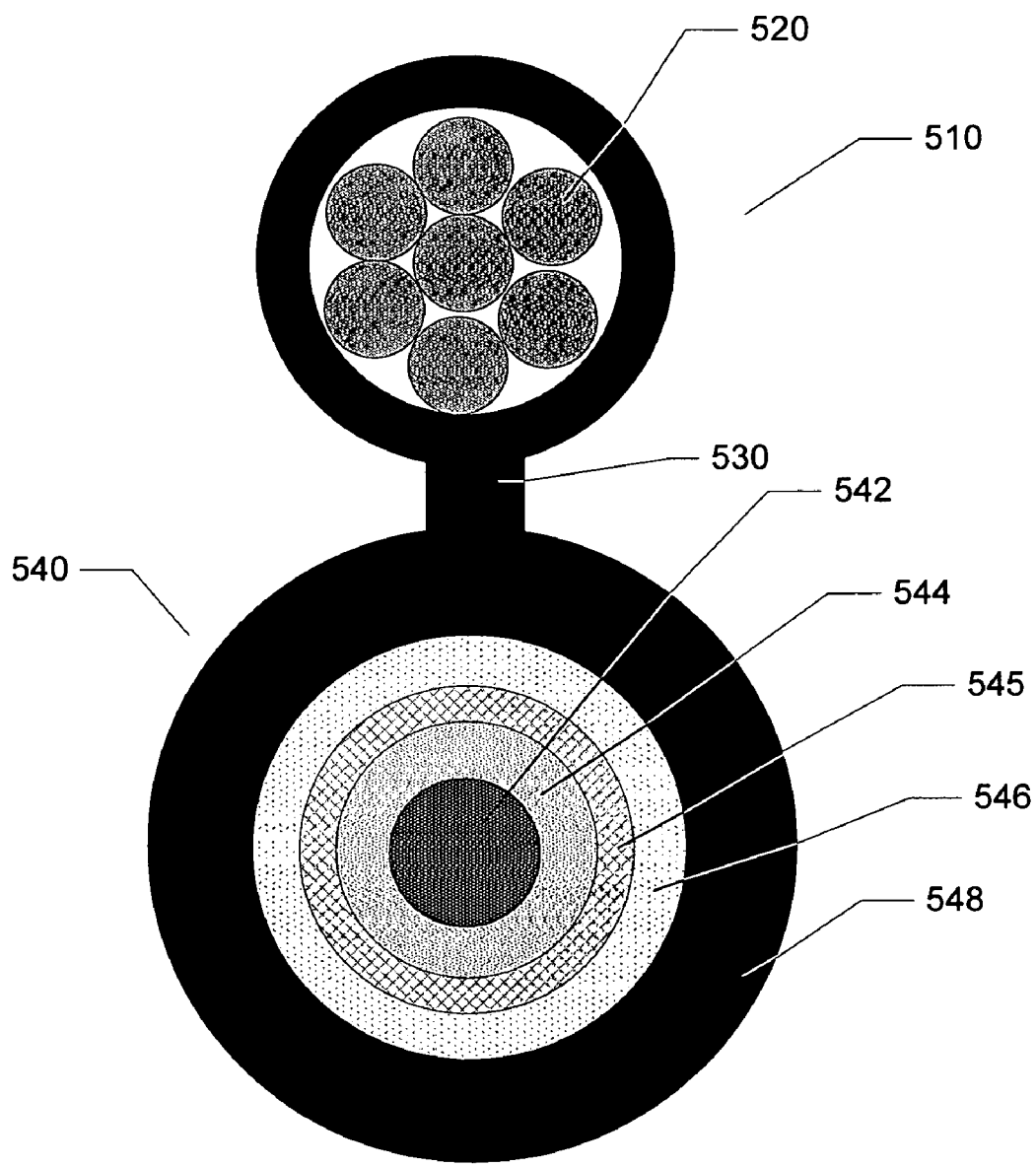
FIG. 5 is a diagrammatic illustration of a fiber optic cable of still another alternative specific exemplary embodiment of the present disclosure.

FIG. 5 is a diagrammatic illustration of a fiber optic cable of still another alternative specific exemplary embodiment of the present disclosure. A cable of FIG. 5 may provide portion 510 to carry so-called "stranded wire(s)" 520 and portion 540 to carry one or more fibers. Portion 510 and portion 540 may be connected by messenger portion 530. Portion 540 may include, for example, tube filling compound 542, loose tube 544, cable filling compound 545, steel tape coated with polyethylene (PE) 546, and PE jacket 548.

Figure 6:
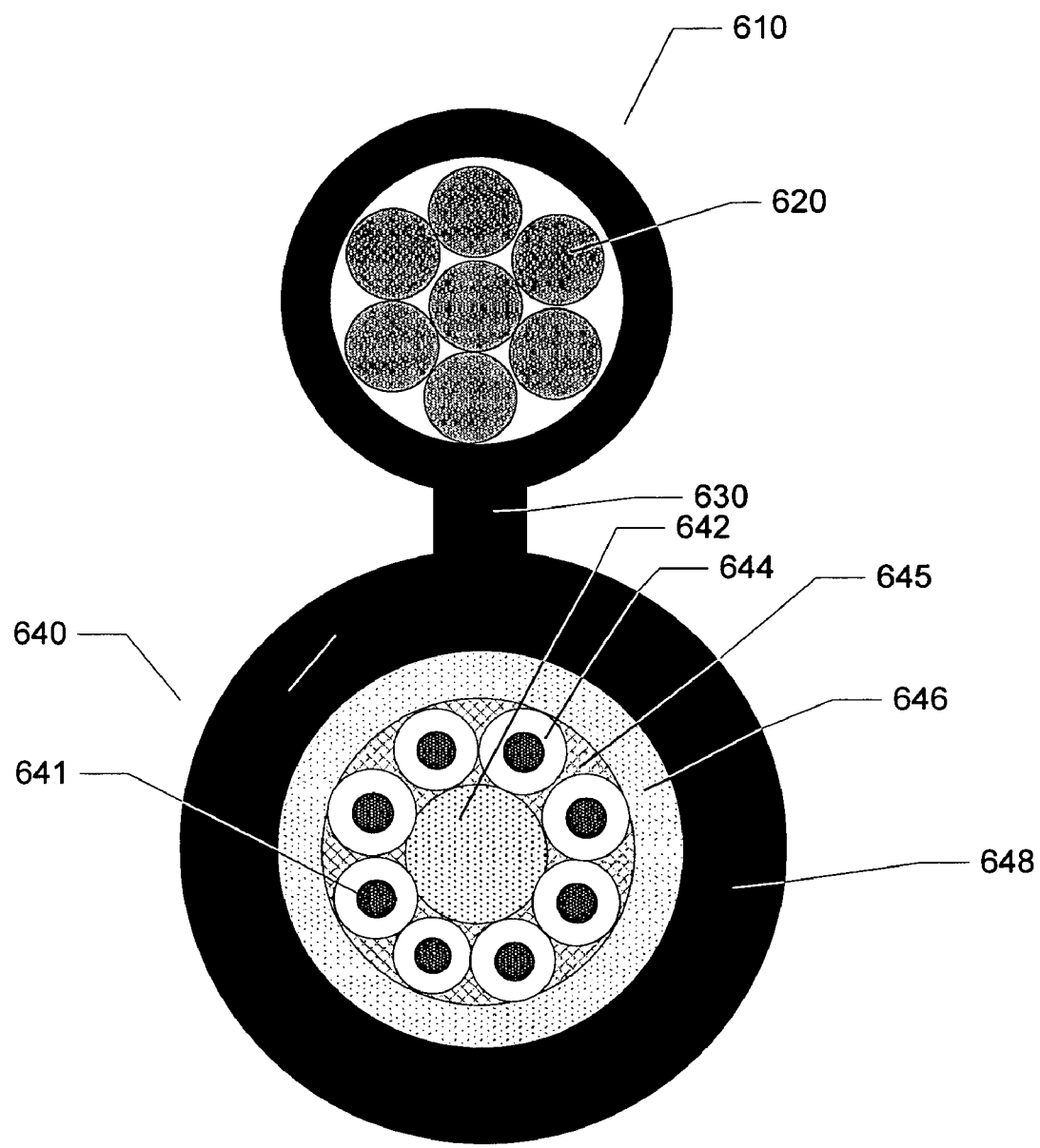
FIG. 6 is a diagrammatic illustration of a fiber optic cable of a further alternative specific exemplary embodiment of the present disclosure.

FIG. 6 is a diagrammatic illustration of a fiber optic cable of a further alternative specific exemplary embodiment of the present disclosure. Similar to the embodiment of FIG. 5, a cable of FIG. 6 may provide portion 610 to carry cable(s) 620 and portion 640 to carry fiber(s) 641. Portion 610 and portion 640 may be connected by messenger portion 630. Fibers 641 may be disposed around strength member 642 and be covered by tape or sheath 644. Cable filling compound may fill space 645 and be contained by tube 646, which in turn is protected by PE jacket 648.

Figure 7:
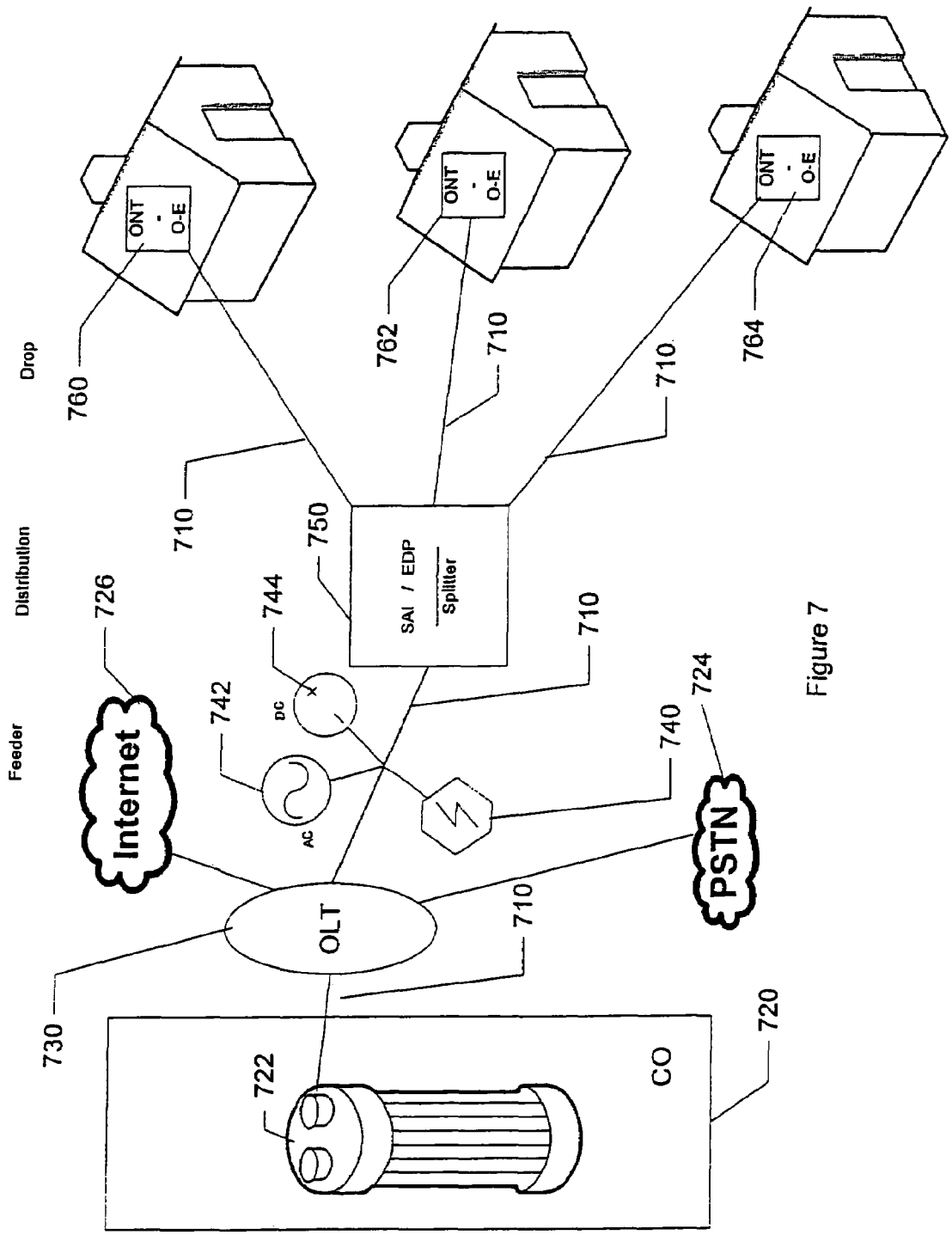
FIG. 7 is a diagrammatic illustration of a specific exemplary embodiment of a network of the present disclosure.

FIG. 7 is a diagrammatic illustration of a specific exemplary embodiment of a network of the present disclosure. The network may include fiber optic cabling 710 containing one or more sheaths adapted to carry power as described above. Cabling 710 may connect two or more components of the network, such as for example CO 720, OLT 730, power source 740 connected to one or more insulated sheaths of cable 710, as described above, SAI 750, and ONTs 760, 762, 764 such as residences or office buildings. Power source 740 is depicted generically here, but will be understood to contemplate alternating electric current (AC) source 742 and direct electric current (DC) source 744. Central Office 720 may include fiber optic tower 722, disclosed here to provide an example of a source of a fiber optic transmission carried by cable 710.

Although shown in FIG. 7 as being located exterior to CO 720, it will be understood that one or more power source 740 may be connected to an insulated conductive sheath of cable 710 at any point, including within CO 720. Power source 740 may connected to an insulated conductive sheath of the present disclosure by any one of a number of suitable means. By accessing an exposed, uninsulated, portion of the sheath, power source 740 may be connected by clamps, alligator clips, screws, and so forth.

OLT 750 may include the optical interfaces to the outside plant, as well as interfaces to the core networks, such as PSTN 724, ATM, Internet 726 or local media servers. The feeder section of the network, also described as the service area, may include up to 400 homes or buildings. The feeder cable, which may contain dozens to hundreds of fibers, may be aerial or buried along the feeder route.

The portion of the network between the feeder and the drop section may be thought of as beginning with the SAI and ending at the end distribution point (EDP). This distribution portion may include the splitters, splitter housings, fiber, conduit, splices and man- or hand-holes. The EDP may include a physical pedestal close to servicing subscriber premises. The drop section may start at the EDP and end at the subscriber. It may include the optical network terminal (ONT) an optical-to-electric (O-E) converter at the subscriber premises. The ONT terminates the fiber, decodes and interprets the signal, and passes the results to different outputs such as voice, data or video.

The present disclosure contemplates embodiments in which the conductive material of the insulated conductive sheath (or portion thereof) includes a special conductive material. For example, metal conductors such as copper may include copper that has been doped in the manufacturing process to provide a conductor having specified characteristic. Similarly, certain advantageous metal alloys may be selected for inclusion in the conductive material.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus the following claims are hereby incorporated into the Detailed Description, with each claim standing on its own as a separate embodiment.

The description has made reference to several exemplary embodiments. It is understood, however, that the words that have been used are words of description and illustration, rather than words of limitation. Changes may be made within the purview of the appended claims, as presently stated and as amended, without departing from the scope and spirit of the disclosure in all its aspects. Although description makes reference to particular means, materials and embodiments, the disclosure is not intended to be limited to the particulars disclosed; rather, the disclosure extends to all functionally equivalent technologies, structures, methods and uses such as are within the scope of the appended claims.

We claim:

1. A power transmission line construction comprising:
at least one fiber optic core;
an outer jacket housing the fiber optic core; and
one or more protective sheaths between the outer jacket and the fiber optic core, at least one of the protective sheaths comprising a first insulated conductor having a first connection portion attachable to a first voltage source and a second insulated conductor having a second connection portion attachable to a second voltage source;
wherein at least one of the protective sheaths comprises an insulated conductive sheath subdivided by two dielectric strips to form a split sheath having two moieties, wherein a first of the moieties comprises the first insulated conductor and a second of the moieties comprises the second insulated conductor.

2. The construction of claim 1, wherein at least one of the insulated conductors comprises a conductive material selected to at least approximate one or more desired performance characteristics.

3. The construction of claim 2, wherein one of the strands comprises a doped copper.

4. The construction of claim 2, wherein one of the strands comprises a metal alloy.

5. A fiber optic network comprising:
one or more optical cables, wherein each of the optical cables comprises one or more conductive sheaths attachable to one or more power sources;
wherein one or more of the optical cables connects two or more network components, and wherein at least one of the network components is selected from the group consisting of an optical line terminal, a service area interface, an end distribution point, an optical-to-electric converter, and a fiber optic transmitters;
wherein at least one of the one or more conductive sheaths comprises an insulated conductive sheath subdivided by two dielectric strips to form a split sheath having two moieties, wherein a first of the moieties comprises a first insulated conductor and a second of the moieties comprises a second insulated conductor.

* * * * *